United States Patent
Palmer et al.

(10) Patent No.: US 6,887,149 B2
(45) Date of Patent: May 3, 2005

(54) COOLING SYSTEM WITH MESH GRILL AND DIRECTIONAL LOUVERS

(75) Inventors: Roger C. Palmer, Scottsdale, AZ (US); David C. Roberts, Scottsdale, AZ (US)

(73) Assignee: AdobeAir, Inc., Phoenix, AR (US)

( * ) Notice: Subject to any disclaimer, the term of this patent is extended or adjusted under 35 U.S.C. 154(b) by 0 days.

(21) Appl. No.: 10/659,232

(22) Filed: Sep. 10, 2003

(65) Prior Publication Data

US 2005/0075066 A1 Apr. 7, 2005

(51) Int. Cl.[7] .............................................. F24F 7/00
(52) U.S. Cl. .......................... 454/284; 454/201; 62/262
(58) Field of Search ................................ 454/201, 202, 454/284; 62/263, 262

(56) References Cited

U.S. PATENT DOCUMENTS

| | | | |
|---|---|---|---|
| 1,743,974 A | 1/1930 | Mallet | |
| 1,798,307 A | 3/1931 | Cooper | |
| 2,984,089 A * | 5/1961 | Whitesel | 62/429 |
| 3,031,173 A | 4/1962 | Kohl et al. | 261/106 |
| 3,211,437 A | 10/1965 | Jaye | 261/3 |
| 3,686,830 A | 8/1972 | Huntington | 55/233 |
| 3,738,621 A * | 6/1973 | Anderson | 261/29 |
| 3,791,102 A | 2/1974 | Huntington | 55/32 |
| 3,820,353 A | 6/1974 | Shiraishi et al. | 62/305 |
| 3,867,486 A * | 2/1975 | Nagele | 261/29 |
| 4,026,971 A | 5/1977 | Glasoe | 261/29 |
| 4,045,523 A | 8/1977 | Goettl | 261/97 |
| 4,080,410 A | 3/1978 | Goettl | 261/97 |
| 4,101,609 A | 7/1978 | Sumrow | 261/105 |
| 4,200,599 A | 4/1980 | Goettl | 261/97 |
| 4,231,975 A | 11/1980 | Peltier | 261/99 |
| 4,234,526 A | 11/1980 | Mackay et al. | 261/106 |
| 4,309,365 A | 1/1982 | Van Ness et al. | 261/29 |
| 4,338,264 A | 7/1982 | Seeley | 261/29 |
| 4,419,300 A | 12/1983 | VanNess et al. | 261/106 |
| 4,440,000 A | 4/1984 | Bacchus et al. | 62/310 |
| 4,443,386 A | 4/1984 | Wrightson | 261/29 |
| 4,460,394 A | 7/1984 | Wrightson | 55/491 |
| 4,553,404 A * | 11/1985 | Malchow et al. | 62/262 |
| 4,556,521 A | 12/1985 | Baigas | 261/94 |
| 4,634,339 A * | 1/1987 | Keddy | 415/70 |
| 4,649,000 A | 3/1987 | Biesemeyer | 261/92 |
| 4,657,709 A | 4/1987 | Goettl | 261/3 |
| 4,672,820 A | 6/1987 | Goettl | 62/304 |
| 4,699,207 A * | 10/1987 | Hanemaayer | 165/41 |
| 4,770,087 A * | 9/1988 | Danley et al. | 454/195 |
| 4,774,030 A | 9/1988 | Kinkel et al. | 261/29 |
| 4,833,896 A | 5/1989 | Carlson | 62/304 |
| 4,958,500 A * | 9/1990 | Kuroda et al. | 62/89 |
| 4,977,756 A | 12/1990 | Brock | 62/314 |
| 5,015,420 A | 5/1991 | Jones | 261/29 |
| 5,042,270 A | 8/1991 | Sanchez | 62/314 |
| 5,046,406 A * | 9/1991 | Harris et al. | 454/313 |
| 5,193,355 A * | 3/1993 | Matsumi | 62/262 |
| 5,293,920 A * | 3/1994 | Vagedes | 160/89 |
| 5,330,386 A * | 7/1994 | Calandra | 454/341 |
| 5,850,742 A * | 12/1998 | Bang et al. | 62/89 |
| 6,468,054 B1 * | 10/2002 | Anthony et al. | 417/360 |
| 6,746,324 B2 * | 6/2004 | Achen | 454/283 |

* cited by examiner

*Primary Examiner*—Derek S. Boles
(74) *Attorney, Agent, or Firm*—Foley & Lardner LLP (57) ABSTRACT

A method and apparatus of a cooling system having a housing with an intake and an output vent. The output vent comprising a framework configured to couple to the housing. Directional louvers pivotably mounted in the framework. A mesh grill mounted on the framework with the mesh grill configured with the openings such that the ratio of opening area to grill material area is more than forty percent (40%). Another embodiment provides that the directional louvers include a plurality of vertical louvers and a plurality of horizontal louvers. An alternative embodiment provides that the openings are configured in a polygon shape.

18 Claims, 7 Drawing Sheets

COOLING SYSTEM WITH MESH GRILL AND DIRECTIONAL LOUVERS

BACKGROUND OF THE INVENTION

The present invention relates generally to the field of cooling systems (evaporative coolers and air conditioners), and more particularly to mesh grill for an evaporative cooling or air conditioning system.

Evaporative coolers are well known and used in warm climates to cool the air. Conventional evaporative coolers work by drawing air from outside through a rigid media soaked with water. As the air flows through the soaked media, water is evaporated by the outside air thereby lowering the temperature of the air. The cooled air is then directed into the area to be cooled. Conventional evaporative coolers include a number of elements all of which are stored in the housing. These elements typically include an air blower, a media pad, a water distribution system, an electric motor, and an air intake vent. Air conditioning systems work by recirculating and chilling (cooling) room temperature air and releasing the heat extracted from the room temperature air (i.e., waste heat) outside the room or building being cooled.

Humidifiers are also well known. Humidifiers supply moisture to the air and maintain desired humidity conditions. Humidifiers include a number of elements including a humidifier pad. The relatively low flow of air is directed into the humidifier pads to cause evaporation of the water. The evaporated water is carried off in the air passing through the humidifier. However, such conventional humidifier pads do not allow for sufficient air flow through the pads sufficient to significantly lower the temperature of the air as do the media pads of conventional evaporative coolers.

Conventional outlet grills on evaporative coolers, air conditioner and humidifiers typically are a plurality of horizontal openings arranged in a row and column configuration as illustrated in FIG. 1.

Thus, there is a need for a mesh grill for a cooling system that maximizes grill openings relative to the grill material to maximize air flow. There is a further need for a grill for a cooling system that is aesthetically pleasing and configured to inhibit or prevent insertion of objects into or through the grill.

SUMMARY OF THE INVENTION

There is provided a cooling system having a housing with an intake and an output vent. The output vent comprising a framework configured to couple to the housing. Directional louvers pivotably mounted in the framework. A mesh grill mounted on the framework with the mesh grill configured with the openings such that the ratio of opening area to grill material area is more than forty percent (40%). Another embodiment provides that the directional louvers include a plurality of vertical louvers and a plurality of horizontal louvers. An alternative embodiment provides that the openings are configured in a polygon shape.

There is also provided a method for controlling air flow in a cooling system, with the cooling system having a housing with an intake vent and output vent. The method comprises the steps of providing a framework configured to mount to the housing over the output vent. Mounting a plurality of directional louvers in the framework. Configuring a mesh grill with openings having a ratio of opening area to grill material area of more than forty percent (40%). Mounting the mesh grill on the framework. Adjusting the directional louvers to direct air flow through the housing and out the output vent. An alternative embodiment of the method provides directional louvers and include a plurality of vertical and horizontal louvers and includes the step of adjusting one of the plurality of vertical louvers and horizontal louvers.

DETAILED DESCRIPTION OF EXEMPLARY EMBODIMENTS

Referring to the Figures, an evaporative cooler unit 10 is shown according to an exemplary embodiment. The evaporative cooler 10 includes a casing or housing 12. FIGS. 1–4 illustrates a prior art grill having exposed louvers.

Figure 1A:
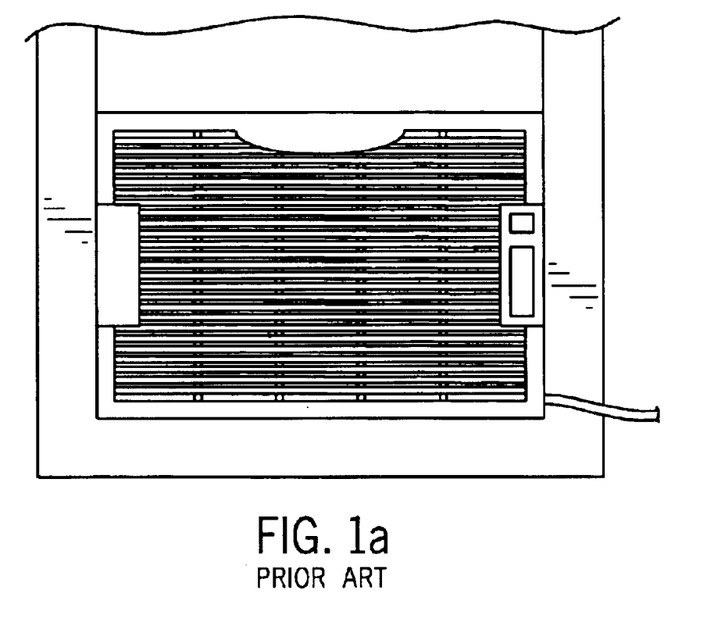
FIG. 1a–1d are perspective views of prior art grills mounted in front of louvers in a cooling unit.
Figure 1B:
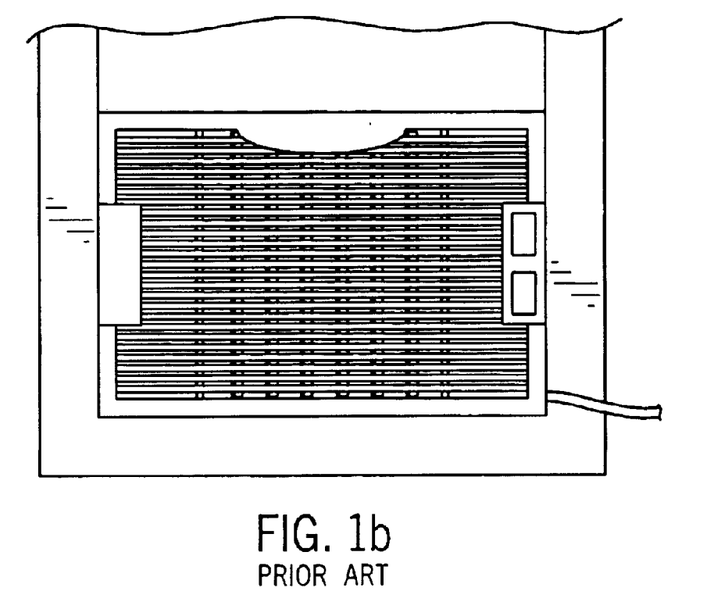
Figure 1C:
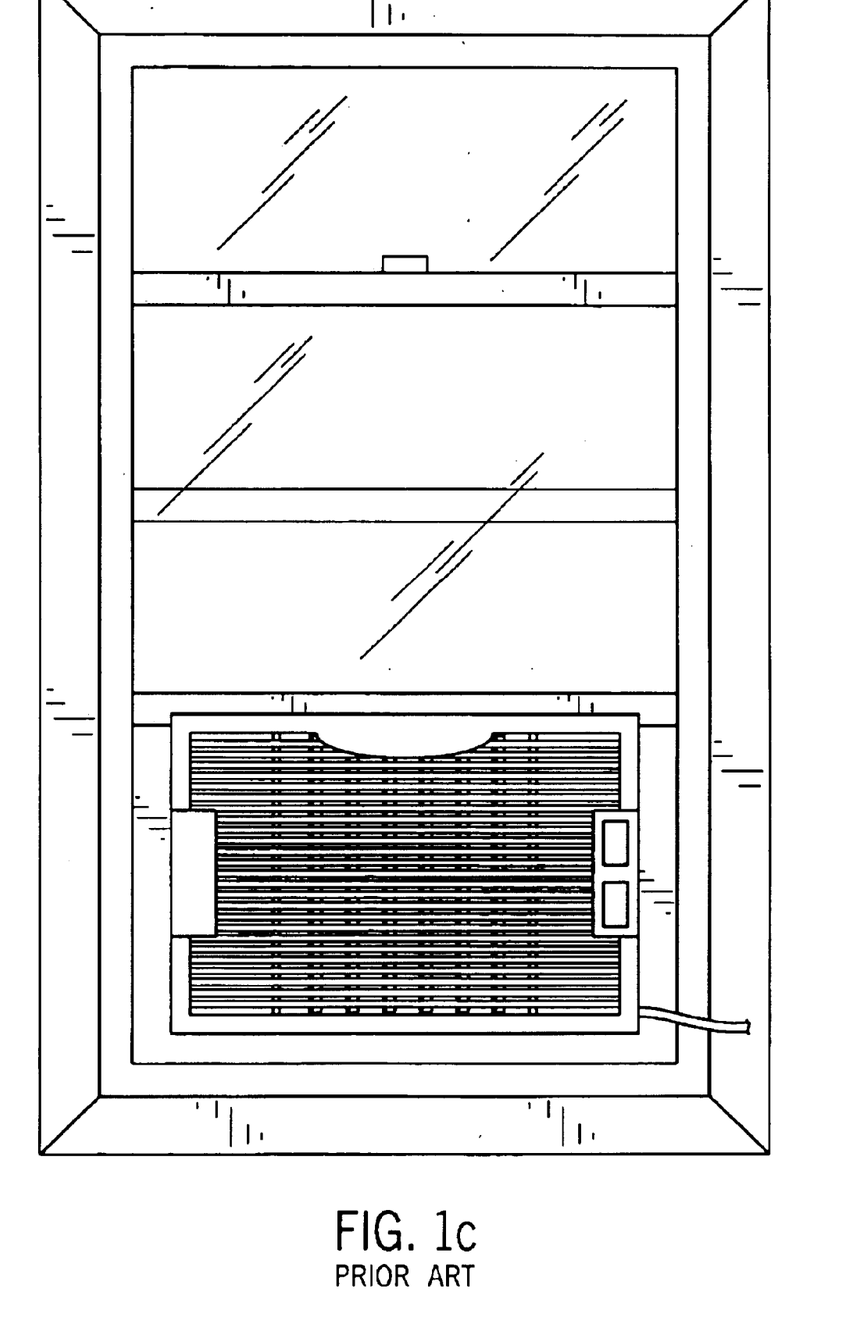
Figure 1D:
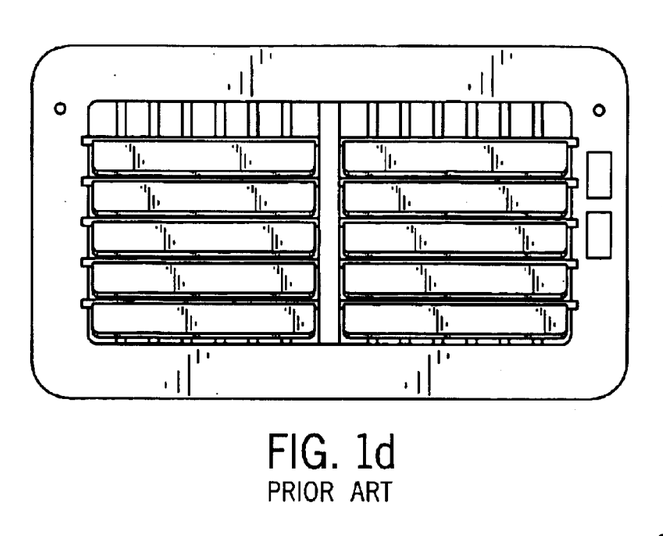
Figure 2:
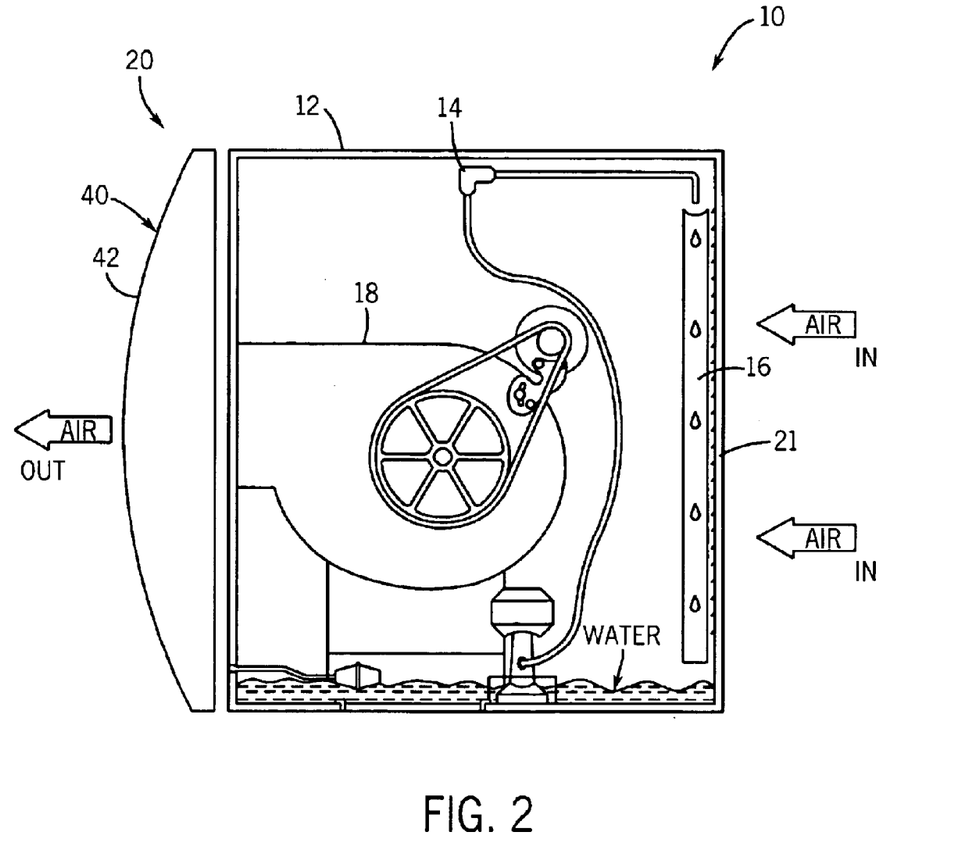
FIG. 2 is a sectional view of an exemplary embodiment of an evaporative cooling unit.

Referring to FIG. 2, a water distribution network 14 disburses water over the vertically upright evaporative media pad 16. A fan or blower 18 draws exterior air through an air intake or louver vent 20 and through pads 16 soaked with water. The temperature of the exterior air is reduced or cooled due to the evaporation of the water in the media pad 16.

Referring further to FIG. 2, the cooled air is blown out of housing 12 by blower 18. Blower 18 can include a motor connected to a pulley moving a circular fan for venting the cooled air to a desired location such as a work or residential space. The evaporative cooler 10 includes a wet chamber according to a preferred embodiment, and may include a dry chamber that is intended to be substantially free of water according to an alternative embodiment. It should be noted that the exhaust air in FIG. 2 is vented out the side of the housing 12, however, it is also contemplated that the exhaust air can be vented out of the back or bottom of the housing 12 as determined by the manufacturer or user of the evaporative cooler unit 10. Appropriate baffles and ducts configured in the housing 12 of the evaporative cooler unit 10 can be used to direct the air flow as determined by the user.

A water recirculation system for recycling non-evaporated water back to pad 16 is also shown in FIG. 2. The recirculation system includes a sensor shown as a float for providing a signal representative of the volume or level of non-evaporated water. The recirculation system also includes a pump assembly having a water pump connected to a water distribution network 14 by a hose. Water distribution network 14 provides for the disbursion of the recycled as well as "original" or source water over the top of the pad 16. It should be understood that the hose of the water distribution network 14 can be a tube and can be rigid or flexible.

It is desirable to maximize the air flow through the evaporative cooler 10 to provide sufficient evaporation of the water for the evaporative cooler 10. It is also desirable to minimize the change in pressure of flow of air (for example at about 250 feet per minute) through the evaporative cooler 10. As used in this disclosure, the term "pressure drop" means and includes the change in the pressure of the flow of air as it enters the evaporative cooler 10 through an intake vent 21 at outside air temperature and as it exits the grill 20 (i.e., the static pressure difference between the air inlet side and the air outlet side of the cooler). The pressure drop should be relatively small due in part to the configuration of the apertures of the media pad and the configuration of the grill 40. Very low pressures are generally expressed in inches of water (rather than pounds-force/sq. inch, pounds per square inch, or psi). A manometer may be used to measure such pressure drop across the media pad 16. The lower the pressure drops, the higher the air flow and cooling capacity of the grill 20. It is known that direct impingement air flow onto a person can create additional cooling. It is advantageous to direct the flow of air as the air leaves the cooling unit to a desired area of the room, building, or volume being cooled.

Figure 3:
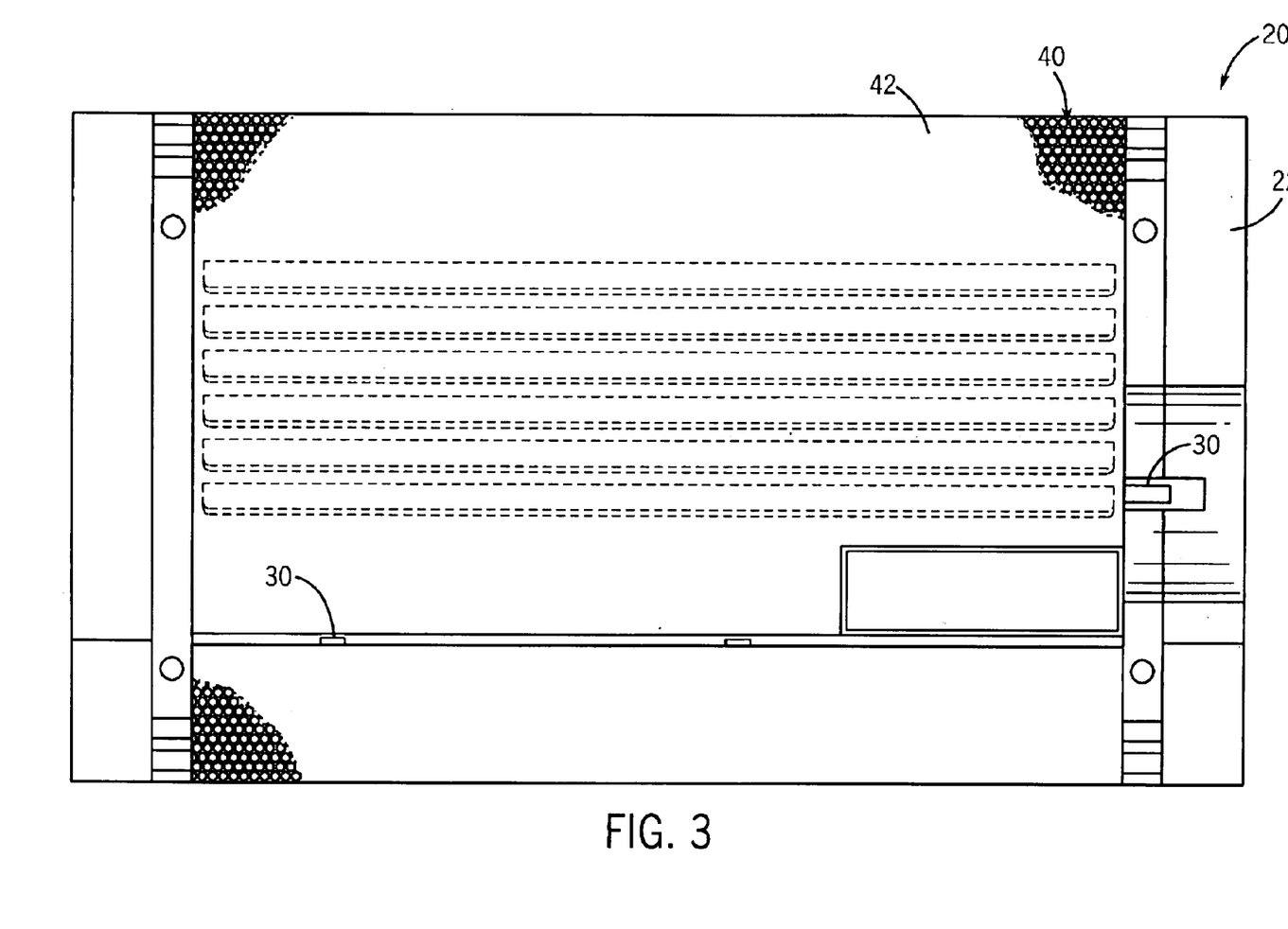
FIG. 3 is a perspective view of a mesh grill of a cooling unit according to an exemplary embodiment.
Figure 4:
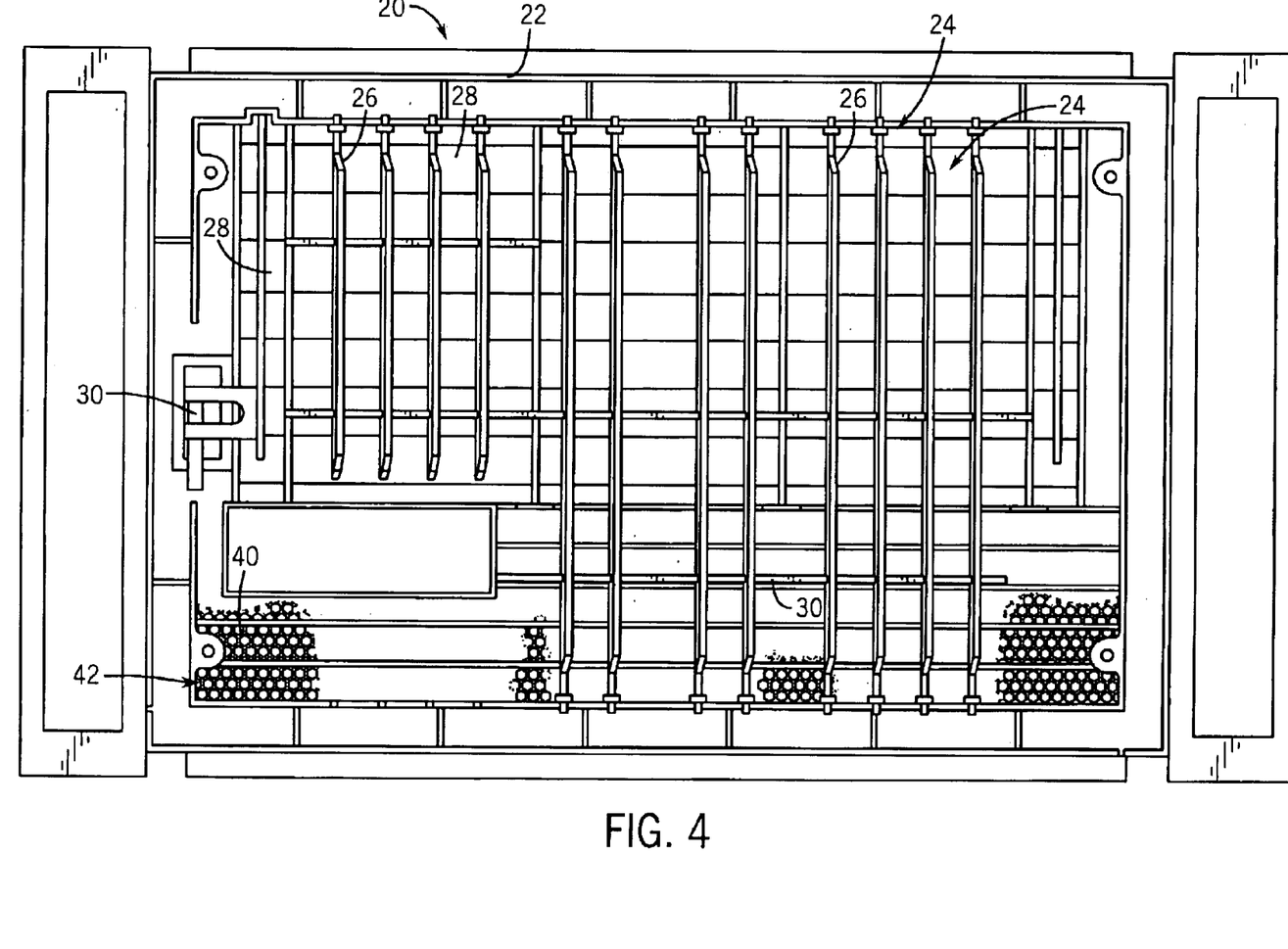
FIG. 4 is a perspective view of the inside of the mesh grill illustrated in FIG. 3.
Figure 6:
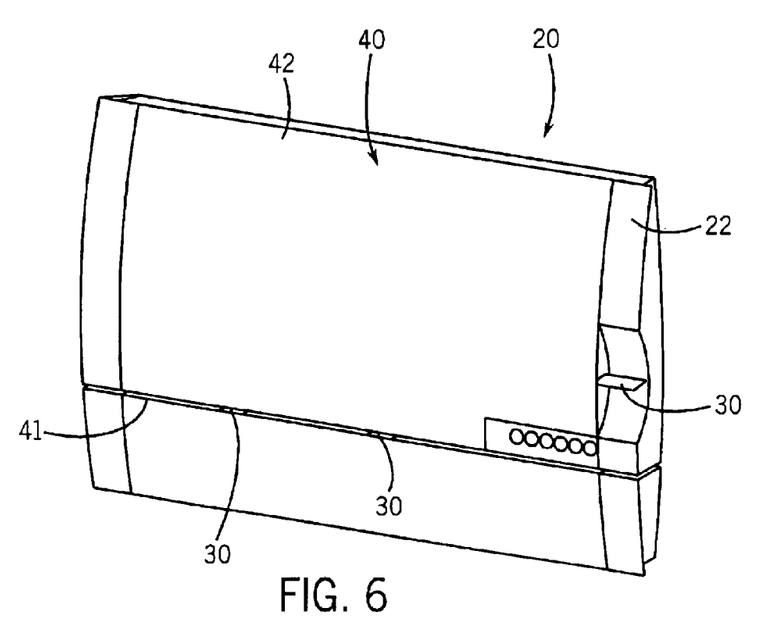
FIG. 6 is a front perspective view of an exemplary embodiment of a mesh grill mounted on a framework.
Figure 7:
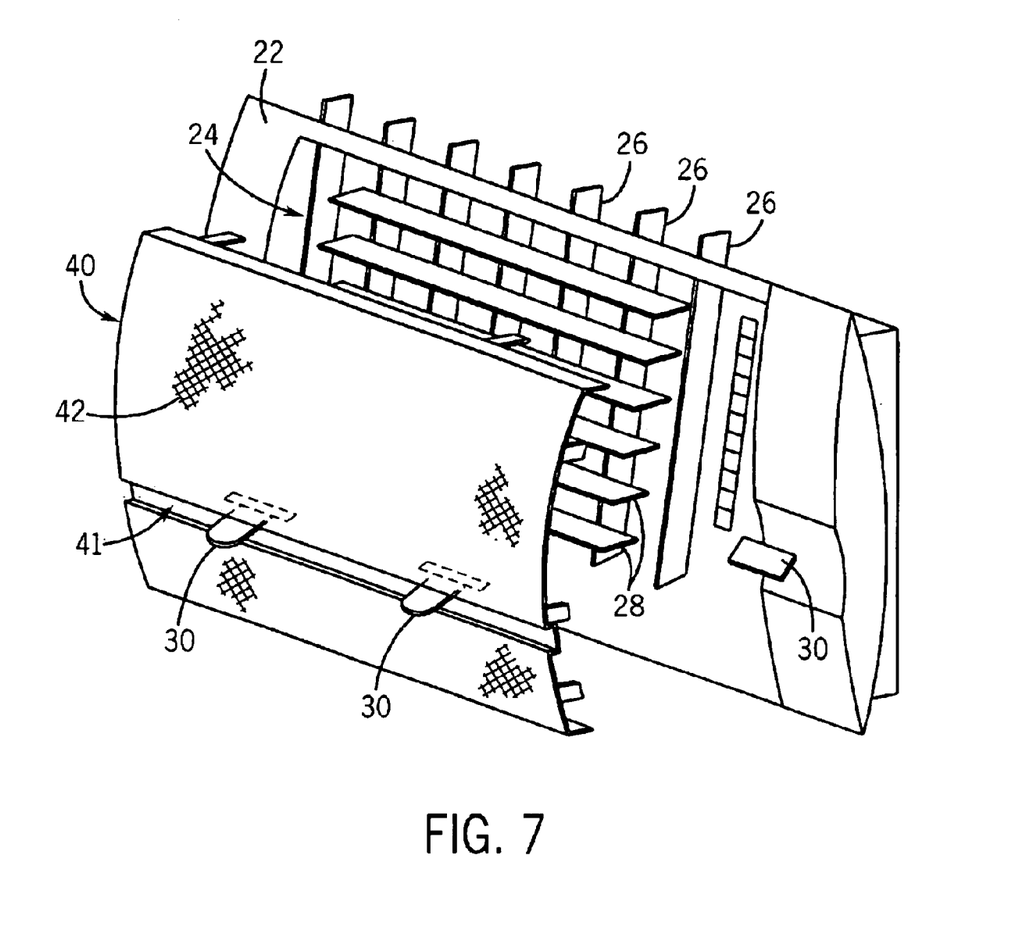
FIG. 7 is an exploded perspective view of the mesh grill and louver assembly illustrated in FIG. 6.

Referring now to FIGS. 2, 3, 4 and 6–7 there is illustrated an air output or vent 20. The vent 20 is mounted to the housing 12 by any suitable means such as screws, clips, fasteners or the like. The air output or louver vent 20 includes a framework 22 which supports directional louvers 24. Directional louvers 24 include a plurality of vertical 26 and a plurality of horizontal 28 louvers pivotably mounted in the framework 22. An apparatus 30 to move the louvers to a desired position is coupled to the directional louvers 24. The apparatus 30 can be manually operated, for example by levers, or coupled to a motor, for example, an electric motor. The apparatus 30 can be configured to extend through an opening 41 in the mesh grill 40, as illustrated in FIG. 6 and the apparatus 30 can be configured alongside the mesh grill as illustrated in FIGS. 3 and 6. It is also contemplated to remotely control the position of the directional louvers 24 as well as other functions (for example, fan speed) of the cooler 10. It should be understood that the vertical 26 and horizontal 28 louvers can be moved independently of each other and typically can be positioned from a fully closed position to a fully open position within the confines of the framework 22. The louvers may be of different lengths. A preferred embodiment of the directional louvers 24 provides for a dark coloring, for example black, of the louver. Such dark coloring tends to hide the louvers behind the mesh grill 40 thereby giving a "no louvers" look. (See FIG. 6).

A grill 40 is positioned on the outside or exterior plane of the framework 22 of the intake vent 20 as illustrated in FIG. 3. The grill 40 is configured with openings (for example, polygon shape) such that the ratio of total opening area OA to total grill material GM area is more than forty percent (40%). (See FIG. 5) The illustrated polygon shaped openings (See FIGS. 3–5) allow sufficient air flow into the housing 12 and across the evaporative media pad 16 as described above with a minimum of pressure drop. The polygon shaped openings also provide an aesthetically pleasing arrangement.

Figure 5:
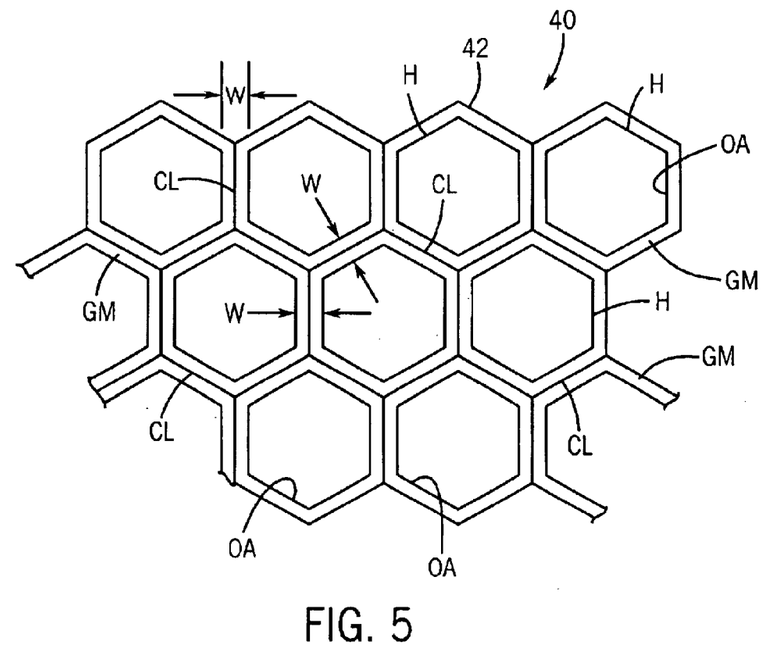
FIG. 5 is a partial schematic of an exemplary embodiment of a mesh grill for use in a cooling system.

FIG. 5 is an illustration of a partial grill configured with hexagon H shaped openings, however, the openings can be any suitable configuration, for example circles, diamond, ovals or the like. The illustrated mesh 42 is configured with lateral members having a uniform width W along a center line CL to define plurality of adjacent hexagon H openings throughout the grill 40. It should be understood that other polygon shapes can be configured to form the mesh 42 of the grill 40. It is also contemplated that the width W of each lateral member of the polygon can vary in a non-linear manner as an alternative embodiment of the mesh 42 of the grill 40 on the air intake vent 20.

According to a preferred embodiment, the distance between lateral members across from each other is 4.7 mm and the width of the lateral member is nominally 4.0 mm. The mesh grill 40 can be configured to fit all or part of the frame work 22 and can be flat, curved or such other configuration appropriate for the application of the evaporative cooling unit 10.

The grill 40 can be composed of any suitable material such as metal (for example aluminum or steel), fabric or plastic. The grill 40 can be manufactured by conventional means such as machining, punching, weaving, stretching, or molding. The grill 40 can be painted, the lateral members covered with decal films, or tinted during the manufacturing process.

The grill 40 provides a decorative feature to the cooling unit 10. The mesh grill 40 also inhibits or prevents insertion of objects into the evaporative cooling unit 10 without reducing air flow through the unit below desired parameters. The mesh grill 40 further lessens noise from the cooling unit 10, such as blower/fan noise, air flow noise, etc.

It is noted that prior art grills (See FIGS. 1a-1d) may have a small number of large openings relative to the total area of the grill material. Such configurations tend to have large, discreet air currents exiting from the cooling unit. In contrast, the mesh grill 42 of the present disclosure provides a uniform dispersion of air across the face of the grill 40 since the configuration provides a more uniform resistance to the air flow and thereby creating many small air currents exiting the cooling system 10.

The cooling system may be placed outdoors as well as indoors according to any preferred or alternative embodiment. The cooling system is intended to be placed where there is an abundance of fresh air, and may be positioned adjacent to an open window or an external door with additional openings on opposite sides of the room according to alternative embodiments. In this way, the cooling system 10 may draw fresh air from the outside and be drawn through the evaporative media pad 16, cooled, filtered and circulated through the room while the hot, stale air is forced out through the openings on the other side of the room.

The cooling system may be used in a variety of environments including at least: industrial and commercial settings such as industrial plants, factories, assembly lines, warehouses, commercial kitchens, laundries, dry cleaners, greenhouses, confinement farming such as poultry ranches, hog, dairy, etc., retail outlets, garden centers, auto shops, hotel/resorts, etc., residential settings such as workshops, garages, kennels, horse stables, patios, barns, exercise areas, etc., outdoor settings such as loading docks, construction sites, athletic events, tented parties, sporting events, pools and patios, outdoor retail, etc.

It is important to note that the construction and arrangement of the elements of the cooling system with the mesh grill as described is illustrative only. Although only the few embodiments, the present invention has been described in detail in this disclosure, those skilled in the art who review this disclosure will verily appreciate that many modifications are possible (example: variations in sizes, dimensions, structures, shapes and proportions of the various elements, values and parameters, mounting arrangements, use of materials, orientations, etc.) without materially departing from the novel teachings and advantages of the subject matter disclosed herein. Accordingly, all such modifications are intended to be included within the scope of the present invention. The order or sequence of any process or method steps may be varied or re-sequenced according to alternative embodiments. Other substitutions, modifications, changes and omissions may be made in the design, operating conditions and arrangement of the preferred and other exemplary embodiments without departing from the spirit of the present invention.

What is claimed is:

1. A cooling system having a housing with an intake and an output vent, the output vent comprising:

a framework configured to couple to the housing;

directional louvers pivotally mounted in the framework; and a mesh grill mounted on the framework, with the mesh grill configured with openings such that the ratio of opening area to grill material area is more than forty percent, wherein the openings are configured in polygon shape.

2. The cooling system of claim 1, wherein the directional louvers include a plurality of vertical louvers and a plurality of horizontal louvers.

3. The cooling system of claim 2, including an apparatus coupled to the directional louvers.

4. The cooling system of claim 3, wherein the apparatus is manually operated.

5. The cooling system of claim 3, wherein the apparatus is coupled to an electric motor.

6. The cooling system of claim 3, wherein the apparatus is remotely controlled.

7. The cooling system of claim 3, wherein the apparatus is configured to extend through an opening in the mesh grill.

8. The cooling system of claim 3, wherein the apparatus is configured alongside the mesh grill.

9. The cooling system of claim 1, wherein the polygon shape is a hexagon.

10. The cooling system of claim 1, wherein the mesh grill and directional louvers are colored to hide the directional louvers behind the mesh grill.

11. The cooling system of claim 1, wherein the mesh grill includes lateral members having one of a uniform width and a non-uniform width along a center line to define adjacent openings throughout the grill.

12. The cooling system of claim 1, configured as one of a free standing unit and a structure mounted unit.

13. A method of controlling air flow in a cooling system, with the cooling system having a housing with an intake vent and an output vent, the method comprising the steps of:

providing a framework configured to mount to the housing over the output vent;

mounting a plurality oft directional louvers in the frame work;

configuring a mesh grill with openings having a ratio of opening area to grill material area of more than forty percent; including the step of configuring the openings in the shape of a polygon, mounting the mesh grill on the framework; and adjusting the directional louvers to direct air flowing through the housing and out the output vent.

14. The method of claim 13, wherein the directional louvers include a plurality of vertical and horizontal louvers and includes the step of adjusting one of the plurality of vertical louvers and horizontal louvers.

15. The method of claim 14, including the step of coupling the directional louvers to an apparatus to position the louvers from one position to another position.

16. The method of claim 13, including the step of coloring the louvers and mesh grill to hide the directional louvers behind the mesh grill.

17. The method of claim 15, wherein the apparatus is accessed through an one of an opening in the mesh grill and along side the mesh grill.

18. The method of claim 13, wherein the polygon is a hexagon.

* * * * *

UNITED STATES PATENT AND TRADEMARK OFFICE
CERTIFICATE OF CORRECTION

PATENT NO. : 6,887,149 B2
DATED : May 3, 2005
INVENTOR(S) : Roger C. Palmer and David C. Roberts It is certified that error appears in the above-identified patent and that said Letters Patent is hereby corrected as shown below:

Column 6,
Line 12, please replace "oft" with -- of --.

Signed and Sealed this

Twelfth Day of July, 2005

JON W. DUDAS
*Director of the United States Patent and Trademark Office*